(12) United States Patent
Kedem (10) Patent No.: US 11,681,543 B2
(45) Date of Patent: *Jun. 20, 2023

(54) METHODS AND APPARATUS FOR PROVIDING HYPERVISOR LEVEL DATA SERVICES FOR SERVER VIRTUALIZATION

(71) Applicant: Zerto Ltd., Herzilya (IL)

(72) Inventor: Ziv Kedem, Herzilya (IL)

(73) Assignee: Zerto Ltd.

( * ) Notice: Subject to any disclaimer, the term of this patent is extended or adjusted under 35 U.S.C. 154(b) by 35 days.

This patent is subject to a terminal disclaimer.

(21) Appl. No.: 17/356,809

(22) Filed: Jun. 24, 2021

(65) Prior Publication Data

US 2021/0326166 A1 Oct. 21, 2021

Related U.S. Application Data

(63) Continuation of application No. 16/654,557, filed on Oct. 16, 2019, now Pat. No. 11,048,545, which is a
(Continued)

(51) Int. Cl.
*G06F 9/455* (2018.01)
*G06F 3/06* (2006.01)
(Continued)

(52) U.S. Cl.
CPC .......... *G06F 9/45558* (2013.01); *G06F 3/067* (2013.01); *G06F 3/0619* (2013.01);
(Continued)

(58) Field of Classification Search
CPC .. G06F 9/45558; G06F 3/0619; G06F 3/0653; G06F 3/0665; G06F 3/067;
(Continued)

(56) References Cited

U.S. PATENT DOCUMENTS

| 4,862,411 A * | 8/1989 | Dishon ................. G11C 29/74 711/158 |
| 5,212,784 A | 5/1993 | Sparks |

(Continued)

FOREIGN PATENT DOCUMENTS

WO   WO-2009/151445   12/2009

OTHER PUBLICATIONS

"Zerto Hits Triple-Digit Growth Once Again Builds Toward a Future of Uninterrupted Technology," Zerto, Feb. 3, 2015, 2 pages.
(Continued)

*Primary Examiner* — Farley Abad
(74) *Attorney, Agent, or Firm* — Foley & Lardner LLP (57) ABSTRACT

A hypervisor virtual server system, including a plurality of virtual servers, a plurality of virtual disks that are read from and written to by the plurality of virtual servers, a physical disk, an I/O backend coupled with the physical disk and in communication with the plurality of virtual disks, which reads from and writes to the physical disk, a tapping driver in communication with the plurality of virtual servers, which intercepts I/O requests made by any one of said plurality of virtual servers to any one of said plurality of virtual disks, and a virtual data services appliance, in communication with the tapping driver, which receives the intercepted I/O write requests from the tapping driver, and that provides data services based thereon.

18 Claims, 2 Drawing Sheets

Related U.S. Application Data continuation of application No. 15/240,847, filed on Aug. 18, 2016, now Pat. No. 10,459,749, which is a continuation of application No. 13/039,446, filed on Mar. 3, 2011, now Pat. No. 10,649,799.

(60) Provisional application No. 61/314,589, filed on Mar. 17, 2010.

(51) Int. Cl.
*G06F 9/54* (2006.01)
*G06F 11/14* (2006.01)

(52) U.S. Cl.
CPC .......... *G06F 3/0653* (2013.01); *G06F 3/0665* (2013.01); *G06F 3/0689* (2013.01); *G06F 9/45533* (2013.01); *G06F 9/545* (2013.01); *G06F 11/1471* (2013.01); *G06F 2009/4557* (2013.01); *G06F 2009/45579* (2013.01); *G06F 2009/45595* (2013.01); *G06F 2209/542* (2013.01)

(58) Field of Classification Search
CPC .... G06F 3/0689; G06F 9/45533; G06F 9/545; G06F 11/1471; G06F 2009/4557; G06F 2009/45579; G06F 2009/45595; G06F 2209/542

See application file for complete search history.

(56) References Cited

U.S. PATENT DOCUMENTS

| | | | |
|---|---|---|---|
| 5,544,347 A | 8/1996 | Yanai et al. | |
| 5,649,152 A | 7/1997 | Ohran et al. | |
| 5,664,186 A | 9/1997 | Bennett et al. | |
| 5,835,953 A | 11/1998 | Ohran | |
| 5,933,653 A | 8/1999 | Ofek | |
| 5,935,260 A | 8/1999 | Ofer | |
| 5,991,813 A | 11/1999 | Zarrow | |
| 6,073,209 A | 6/2000 | Bergsten | |
| 6,073,222 A | 6/2000 | Ohran | |
| 6,477,591 B1 * | 11/2002 | VanderSpek | G06F 11/2087 714/1 |
| 6,658,591 B1 | 12/2003 | Arndt | |
| 6,910,160 B2 | 6/2005 | Bajoria et al. | |
| 6,944,847 B2 | 9/2005 | Desai et al. | |
| 7,063,395 B2 | 6/2006 | Gagne et al. | |
| 7,143,307 B1 | 11/2006 | Witte et al. | |
| 7,325,159 B2 | 1/2008 | Stager et al. | |
| 7,421,617 B2 | 9/2008 | Anderson et al. | |
| 7,464,126 B2 | 12/2008 | Chen | |
| 7,475,207 B2 | 1/2009 | Bromling et al. | |
| 7,516,287 B2 | 4/2009 | Ahal et al. | |
| 7,523,277 B1 | 4/2009 | Kekre et al. | |
| 7,557,867 B2 | 7/2009 | Goo | |
| 7,577,817 B2 | 8/2009 | Karpoff et al. | |
| 7,577,867 B2 | 8/2009 | Lewin et al. | |
| 7,603,395 B1 | 10/2009 | Bingham et al. | |
| 7,647,460 B1 | 1/2010 | Wilson et al. | |
| 7,720,817 B2 | 5/2010 | Stager et al. | |
| 7,765,433 B1 | 7/2010 | Krishnamurthy | |
| 7,791,091 B2 | 9/2010 | Nagai | |
| 7,849,361 B2 | 12/2010 | Ahal et al. | |
| 7,853,764 B2 | 12/2010 | Bitner et al. | |
| 7,865,893 B1 | 1/2011 | Omelyanchuk et al. | |
| 7,971,091 B1 | 6/2011 | Bingham et al. | |
| 8,020,037 B1 | 9/2011 | Schwartz et al. | |
| 8,156,301 B1 | 4/2012 | Khandelwal et al. | |
| 8,296,419 B1 | 10/2012 | Khanna et al. | |
| 8,352,941 B1 | 1/2013 | Protopopov et al. | |
| 8,650,299 B1 | 2/2014 | Huang et al. | |
| 2003/0149910 A1 | 8/2003 | Qin et al. | |
| 2004/0068561 A1 | 4/2004 | Yamamoto et al. | |
| 2004/0153639 A1 | 8/2004 | Cherian et al. | |
| 2005/0071588 A1 | 3/2005 | Spear et al. | |
| 2005/0171979 A1 | 8/2005 | Stager et al. | |
| 2005/0182953 A1 | 8/2005 | Stager et al. | |
| 2005/0188256 A1 | 8/2005 | Stager et al. | |
| 2006/0047996 A1 | 3/2006 | Anderson et al. | |
| 2006/0048002 A1 | 3/2006 | Kodi et al. | |
| 2006/0112222 A1 | 5/2006 | Barrall | |
| 2006/0129562 A1 | 6/2006 | Pulamarasetti et al. | |
| 2006/0130154 A1 | 6/2006 | Lam et al. | |
| 2006/0136685 A1 | 6/2006 | Griv et al. | |
| 2006/0161394 A1 | 7/2006 | Dulberg et al. | |
| 2007/0028244 A1 | 2/2007 | Landis et al. | |
| 2007/0112772 A1 | 5/2007 | Morgan et al. | |
| 2007/0162513 A1 | 7/2007 | Lewin et al. | |
| 2007/0220311 A1 * | 9/2007 | Lewin | G06F 11/1471 714/6.32 |
| 2007/0266433 A1 * | 11/2007 | Moore | G06F 21/53 726/15 |
| 2008/0086726 A1 | 4/2008 | Griffith et al. | |
| 2008/0177963 A1 | 7/2008 | Rogers | |
| 2008/0195624 A1 | 8/2008 | Ponnappan et al. | |
| 2008/0208555 A1 | 8/2008 | Tatsuoka et al. | |
| 2009/0150510 A1 | 6/2009 | Kovacs et al. | |
| 2009/0172666 A1 * | 7/2009 | Yahalom | G06F 3/067 718/1 |
| 2009/0187776 A1 | 7/2009 | Baba et al. | |
| 2009/0249330 A1 | 10/2009 | Abercrombie et al. | |
| 2009/0283851 A1 | 11/2009 | Chen | |
| 2009/0307396 A1 | 12/2009 | Nogueras et al. | |
| 2010/0017801 A1 | 1/2010 | Kundapur | |
| 2010/0027552 A1 | 2/2010 | Hill | |
| 2010/0058335 A1 | 3/2010 | Weber | |
| 2010/0115332 A1 | 5/2010 | Zheng et al. | |
| 2010/0115513 A1 * | 5/2010 | Moriki | G06F 9/45533 718/1 |
| 2010/0150341 A1 | 6/2010 | Dodgson et al. | |
| 2010/0175064 A1 | 7/2010 | Brahmaroutu | |
| 2010/0198949 A1 * | 8/2010 | Elrom | G06F 16/273 709/222 |
| 2010/0198972 A1 | 8/2010 | Umbehocker | |
| 2010/0250824 A1 | 9/2010 | Belay | |
| 2010/0250892 A1 | 9/2010 | Logan et al. | |
| 2010/0274886 A1 | 10/2010 | Nahum et al. | |
| 2010/0274890 A1 | 10/2010 | Patel | |
| 2011/0022812 A1 | 1/2011 | Van Der Linden et al. | |
| 2011/0055471 A1 | 3/2011 | Thatcher et al. | |
| 2011/0075674 A1 | 3/2011 | Li et al. | |
| 2011/0087874 A1 | 4/2011 | Timashev et al. | |
| 2011/0099200 A1 | 4/2011 | Blount et al. | |
| 2011/0099342 A1 | 4/2011 | Ozdemir | |
| 2011/0107331 A1 | 5/2011 | Evans et al. | |
| 2011/0125980 A1 | 5/2011 | Brunet et al. | |
| 2011/0131183 A1 | 6/2011 | Chandhok et al. | |
| 2011/0153569 A1 | 6/2011 | Fachan et al. | |
| 2011/0161299 A1 | 6/2011 | Prahlad et al. | |
| 2011/0161301 A1 | 6/2011 | Pratt et al. | |
| 2011/0179341 A1 | 7/2011 | Falls et al. | |
| 2011/0202734 A1 | 8/2011 | Dhakras et al. | |
| 2011/0264786 A1 | 10/2011 | Kedem et al. | |
| 2012/0110086 A1 | 5/2012 | Baitinger et al. | |
| 2012/0110572 A1 | 5/2012 | Kodi et al. | |
| 2012/0185913 A1 | 7/2012 | Martinez et al. | |
| 2013/0014104 A1 | 1/2013 | Natanzon et al. | |
| 2014/0331221 A1 | 11/2014 | Dong et al. | |

OTHER PUBLICATIONS

A Comparison of Hypervisor-based Replication vs. Current and Legacy BC/DR Technologies, 2012.

Affidavit of Christopher Butler and Exhibit A regarding Ex. 1, dated Nov. 8, 2017.

Affidavit of Christopher Butler and Exhibit A regarding Exs., dated Nov. 8, 2017.

Amended Order Governing Mediation Conferences and Meditation Statements for The United States District Court For the District of Delaware Case 1:12-cv-00956-GMS dated Jun. 1, 2016.

Amendment "B" and Response to Office Action from Prosecution History of U.S. Pat. No. 7,603,395, dated Apr. 9, 2009, (13 pages).

(56) References Cited

OTHER PUBLICATIONS

Amendment "E" and Response to Office Action from Prosecution History of U.S. Pat. No. 7,971,091., dated Nov. 19, 2010, (14 pages).
Amendment and Response to Office Action from Prosecution History of U.S. Pat. No. 7,647,460, dated Aug. 30, 1999(22 pages).
Answer Claim Construction Brief of Plaintiffs *EMC Corporation and EMC Israel Development Center, LTD., EMC Corporation and EMC Israel Development Center, LTD.*, v. *Zerto, Inc.*, Case No. 12-956(GMS), May 9, 2014, (24 pages).
Appellant Zerto, Inc.'s Certificate of Complaince With Federal Circuit Rule 11 (d) in the United States Court of Appeals for the Federal Circuit, Case No. 2016-1856,—1883, Jan. 24, 2017.
Appellant Zerto, Inc.'s Motion for Extension of Time to File its Initial Brief in the United States District Court for the District of Delaware in Case No. 1:12-cv-00956-GMS, dated May 4, 2016.
Appellants' Brief Pursuant to 37 C.F.R. section 1.192 from Prosecution History of U.S. Pat. No. 7,647,460., May 9, 2002, (34 pages).
Appendix 1844, Case 2016-1856, Document 70-2, filed May 8, 2017.
Appendix 1844, Case 2016-1856, Document 71-2, filed May 9, 2017.
Certificate of Interest in the United States Court of Appeals for the Federal Circuit, *Zerto, Inc.* V. *EMC Corporation* Case No. 17-2519, Sep. 22, 2017.
Certificate of Service for Matthew Lowrie dated May 10, 2017.
Certificate of Service in the United State Court of Appeals for the Federal Circuit, Case No. 16-1856, Counsel Kevin M. Littman, Aug. 8, 2016.
Certificate of Service of Kevin Littman dated Aug. 5, 2016.
Choosing A VSS Provider Veeam Backup Guide for HyperV, Mar. 18, 2015.
Clerk's Notice of Deficient Document, dated Nov. 30, 2017.
Complaint, *EMC Corporation and EMC Israel Development Center, LTD.*, v. *Zerto, Inc.*, Case No. Demand for Jury Trial, Jul. 20, 2012, (13 pages).
Corrected EMC Opening Brief, dated Sep. 16, 2016.
Corrected Entry of Appearance for Michael N. Rader in the United States Court of Appeals for the Federal Circuit, Case No. 17-2519, Sep. 22, 2017.
Corrected Entry of Appearance of Michael Rader dated Sep. 22, 2017.
Corrected Non-Confidential Brief for Cross-Appellants EMC Corporation and EMC Israel Development Center LTD, Appeals from the United States District Court for the District of Delaware in No. 1:12-cv-00956-GMS, Judge Gregory M. Sleet, dated Sep. 16, 2016.
Corrected Notice of Allowance on U.S. Appl. No. 15/231,388 dated Feb. 14, 2020 (2 pages).
Corrected Zerto. Inc.'s Certificate of Interest in the United States Court of Appeals for the Federal Circuit, Case No. 16-1856, 16-1883, Apr. 29, 2016.
Data Loss Avoidance: Near Continuous Data Protection and Streamlined Disaster Recovery, www.veeam.com.
Decision—Motion—Bd. R. 5(a): 121(a) (3), Patent Interference No. 106,070, Sep. 18, 2017.
Declaration of Allan Lipka before Patent Trial and Appeal Board, Patent Interference No. 106,070, dated Jun. 28, 2017.
Declaration of Christos Karamanolis, PH.D., Patent Interference, 106,070, dated Jun. 27, 2017.
Declaration of Ian Jestice, Patent Interference No. 106,070, dated Jul. 6, 2017.
Declaration of James Dowell before Patent Trial and Appeal Board, Patent Interference No. 106,070, dated Jun. 29, 2017.
Declaration of Jeremy Tigan In support of EMC's Renewed Motion for an Ongoing Royalty Rate Covering Post-Judgment Sales in United States District Court for Delaware case 1:12-cv-00956-GMS dated Jul. 22, 2016, Part 2 of 2.
Declaration of Jeremy Tigan in support of EMC's Renewed Motion for an Ongoing Royalty Rate Covering Post-Judgment Sales in United States District Court for Delaware case 1:12-cv-00956-GMS, dated Jul. 22, 2016, Part 1 of 2.
Declaration of John Blumenthal, dated Jul. 28, 2017.
Declaration of Lisa Kieper, dated Nov. 13, 2017.
Declaration of Lucas Silva in Support of Zerto's Opposition to EMC's Renewed Motion for An Ongoing Royalty Rate Covering Post Judgment Sales in the United States District Court for Delaware Case 1:12-cv-00956-GMS, Sep. 1, 2016.
Declaration of Matan Gilat before Patent Trial and Appeal Board, Patent Interference No. 106,070, dated Jun. 29, 2017.
Declaration of Matt Amdur before Patent Trial and Appeal Board, Patent Interference No. 106,070, dated Jun. 29, 2017.
Declaration of Nathan Speed in Support of EMC's Reply Brief in Support of its Motion for a Renewed Ongoing Royalty in the United States District Court for Delaware Case 1:12-vc-00956-GMS dated Oct. 4, 2016.
Declaration of Nathan Speed In Support of Plaintiffs Bill of Costs, Case 1:12-cv-00956-GMS, Aug. 8, 2017.
Declaration of Oded Kedem in Support of Zerto's Opposition to EMC's Renewed Motion for an Ongoing Royalty Rate covering Post Judgement Sales in United States District Court for Delaware Case 1:12-cv-00956-GMS, dated Sep. 1, 2016.
Declaration of Thomas R. Galligan before Patent Trial and Appeal Board, Patent Interference No. 106,070, dated Jul. 6, 2017.
Declaration of Ziv Kedem in Support of Zerto's Opposition to EMC's Renewed Motion for an Ongoing Royalty Rate Covering Post Judgment Sales in the United States District Court for Delaware Case 1:12-cv-00956-GMS, dated Sep. 1, 2016.
Declaration—Bd.R. 203(b) USPTO *Natanzon* (U.S. Appl. No. 13/039,446) *et al.* v *Kedem* (U.S. Appl. No. 13/039,446), dated Jan. 17, 2017.
Defendant FFD013 Appellant Zerto, Inc. FFD019S Motion for Extension of Time to File Its Response/Reply Brief, Appeals from the United States District Court for the District of Delaware in No. 1:12-cv-00956-GMS, Judge Gregory M. Sleet, Sep. 29, 2016.
Defendant Zerto, Inc.'s Amended Answer to the First Amended Complaint, Affirmative Defense, And Counterclaims, *EMC Corporation and EMC Israel Development Center, LTD.*, v. *Zerto, Inc.*, Case No. 12-956-GMS, Aug. 7, 2014, (34 pages).
Defendant Zerto, Inc.'s Claim Construction Answering Brief, *EMC Corporation and EMC Israel Development Center, LTD.*, v. *Zerto, Inc.*, Case No. 12-956 (GMS), May 9, 2014, (23 pages).
Defendant Zerto, Inc.'s Notice of Appeal in the United States District Court for the District of Delaware, Case No. 12-956-GMS, dated Sep. 7, 2017.
Defendant Zerto, Inc.'s Opening Brief in Support of its Motion for Leave to Amend its Answer to the First Amended Complaint, Affirmative Defense and Counterclaims, *EMC Corporation and EMC Israel Development Center, LTD.*, v. *Zerto, Inc.*, Case No. 12-956-GMS, Jun. 6, 2014, (24 pages).
Defendant Zerto, Inc.'s Opening Claim Construction Brief., *EMC Corporation and EMC Israel Development Center, LTD.*, v. *Zerto, Inc.*, Case No. 12-956(GMS), Apr. 11, 2014, (26 pages).
Defendant Zerto, Inc.'s Reply Brief in Support of its Motion for Leave to Amend its Answer to the First Amended Compliant, Affirmative Defense and Counterclaims, *EMC Corporation and EMC Israel Development Center, LTD.*, v. *Zerto, Inc.*, Case No. 12-956-GMS, Jul. 9, 2014, (16 pages).
Defendant Zerto, Inc.'s. Notice Of Appeal in the United States District Court, dated Sep. 7, 2017.
Defendant Zerto, Inc's Motion for Judgment as a Matter of Law of No Willful Infringement of the '867 Patent . . . , Apr. 30, 2015.
Defendant Zerto's Answering Brief in Opposition to Plaintiffs Motion Concerning an Ongoing Royalty Rate Covering Post Judgment Sales in United States District Court for Delaware Case 1:12-cv-00956-GMS dated Sep. 1, 2016.
Defendant Zerto's Notice Of Appeal, Case 1:12-cv-00956-GMS, dated Sep. 7, 2017.
Defendant Zerto's Objections to Plaintiffs Bill of Costs, Case 1:12-cv-00956-GMS, dated Aug. 21, 2017.
Defendant's Answering Brief in Opposition to Plaintiffs' Motion to Strik and Dismiss Defendant's Affirmative Defense and Counterclaims of "Invalidity" based on Assignor Estoppel, *EMC Corpora-*

(56) References Cited

OTHER PUBLICATIONS tion and *EMC Israel Development Center, LTD.*, v. *Zerto, Inc.*, Case No. 12-956(GMS), Nov. 5, 2012, (21 pages).
Deploy Hyper-V Replica, published May 31, 2012.
Double-Take Availability for vSphere: Technical Data Sheet, 2014.
E-mail from Allan Lipka dated Apr. 4, 2006, RE: Ezra Tech DD Presentation.
E-mail from Allan Lipka dated Feb. 28, 2006, RE:Topio.
E-mail from Chen Burshan dated Aug. 17, 2006, Reversion 2.3 core documents.
E-mail from Christos Karamanlis dated Apr. 3, 2006, Ezra Feedback.
E-mail from Christos Karamanolis dated Mar. 9, 2006, Kashya scalability testing.
E-mail from Christos Karamanolis, dated Apr. 3, 2006, RE: Ezra feedback.
E-mail from Christos Karamanolis, dated Jan. 30, 2016. FW:Disaster Recovery.
E-mail from Karthik Rau dated Mar. 15, 2006, RE: Updated Docs.
Email from U.S. Court of Appeals for the Federal Circuit re Nov. 30, 2017 Clerk's Notice of Deficient Document.
Email from USPTO re Mar. 31, 2017 Filing Submission for 106070.
EMC Corporation and EMC Israel Development Center Ltd.'s Certificate of Compliance With Federal Circuit Rule 11 (d) in the United States Court of Appeals for the Federal Circuit, Case No. 2016-1856,—1883, Jan. 24, 2017.
EMC Corporation and EMC Israel Development Center Ltd.'s Docketing Statement in the United States Court of Appeals for the Federal Circuit, Case No. 16-1856, 16-1883, Apr. 29, 2016.
EMC Corporation and EMC Israel Development Center, LTD.'S ANswer to the Amended Counterclaims of Zerto Inc., *EMC Corporation and EMC Israel Development Center, LTD.*, v. *Zerto, Inc.*, Case No. 12-956-GMS, Aug. 25, 2014, (12 pages).
EMC Corporation's Certificate of Interest in the United States Court of Appeals for the Federal Circuit, Case No. 16-1856, 16-1883, Apr. 29, 2016.
EMC Corporation's Certificate of Interest in the United States Court of Appeals for the Federal Circuit, Case No. 17-2519, Sep. 22, 2017.
EMC Corporation's Corrected Certificate of Interest, United States Court of Appeals for the Federal Circuit, Case No. 16-1856,16-1883, Sep. 16, 2016.
EMC Corporation's Corrected Docketing Statement in the United States Court of Appeals for the Federal Circuit, Case No. 17-2519, Sep. 22, 2017.
EMC Recoverpoint Family, 2012.
EMC Recoverpoint for Virtual Machines: Protects and Recovers VMs to Any Point in Time, 2012.
EMC's Amended Certificate of Interest dated Sep. 16, 2016.
EMC's Amended Corporate Disclosure Statement in the United States District Court for Delaware Case 1:12-cv-00956-GMS, Sep. 13, 2016.
EMC's Answer Brief in Opposition to Zerto's Motion For Judgment on the Pleadings on Count III o fthe First Amended Complaint, *EMC Corporation and EMC Israel Development Center, LTD.*, v. *Zerto, Inc.*, Case No. 12-956-GMS, Aug. 11, 2014, (25 pages).
EMC's Answering Brief in Opposition of Zerto's Renewed Motion for Judgment as a Matter of Law or, in the Alternative, for a New Trial, Jul. 17, 2015.
EMC's Answering Brief in Opposition to Zerto's Motion for a New Trial and to Alter or Amend the Judgment, due to an Inconsistent Verdict, Jul. 17, 2015.
EMC's Answering Brief in Opposition to Zerto's Motion for Leave to Amend its Answer to the First Amended Complaint by Adding an Inequitable Conduct Defense and Counterclaims, *EMC Corporation and EMC Israel Development Center, LTD.*, v. *Zerto, Inc.*, Case No. 12-956-GMS, Jun. 23, 2014 (25 pages).
EMC's Certificate of Compliance Rule 11 (d) dated Jan. 24, 2017.
EMC's Certificate of Interest dated Apr. 29, 2016.
EMC's Certificate of Interest in the United States Court of Appeals for the Federal Circuit dated Sep. 22, 2017.
EMC's corrected docketing statement dated Sep. 22, 2017.
EMC's Docketing Statement dated Apr. 29, 2016.
EMC's Motions for Redaction of Electronic Transcripts and Notice of Lodging Redacted Transcripts and Proposed Order dated Apr. 19, 2016.
EMC's Motions to Supplement the Record on its Motion for Permanent Injunction, dated Dec. 4, 2015.
EMC's Notice of Intent to Redact dated Apr. 5, 2016.
EMC's Opening Brief in Support of Its Motion for an Accounting and to Amend the Judgment, Jun. 24, 2015.
EMC's Opening Brief in Support of its Renewed Motion For an Ongoing Royalty Rate Covering Post Judgment Sales in United States District Court for Delaware case 1:12-cv-00956-GMS, dated Jul. 22, 2016.
EMC's Opening Brief in Support of Its Renewed Motion for Judgment as a Matter of Law, Jun. 5, 2015.
EMC's Opposition to Extension of Time to file Response Brief dated Sep. 30, 2016.
EMC's Renewed Motion for an Ongoing Royalty Rate Covering Post-Judgement Sales in the United States District Court for the District of Delaware Case 1:12-cv-00956-GMS dated Jul. 14, 2016.
EMC's Reply Brief in Support of its Renewed Motion for an Ongoing Royalty Rate Covering Post-Judgment Sales in the United States District Court for Delaware Case 1:12-cv-00956-GMS, dated Oct. 4, 2016.
EMC's Reply Brief, dated Jan. 11, 2017.
EMC's Reply in Support Of Its Motion To Supplement The Record On Its Motion for A Permanent Injunction, dated Jan. 4, 2016.
EMC's Response Letter regarding Ongoing Royalty Rates. Case 1:12-cv-00956-GMS, dated Aug. 9, 2017.
Entry of Appearance for Kevin M. Littman in the United States Court of Appeals for the Federal Circuit, Case No. 16-1856, Aug. 5, 2016.
Entry of Appearance for Krishnendu Gupta in the United States Court of Appeals for the Federal Circuit, Case No. 16-1856, 16-1883, Apr. 29, 2016.
Entry of Appearance for Lucas I. Silva in the United States Court of Appeals for the Federal Circuit, Case No. 16-1856, 16-1883, Apr. 29, 2016.
Entry of Appearance for Matthew B. Lowrie, in the United States Court of Appeals for the Federal Circuit, Case No. 16-1856, 16-1883, Apr. 29, 2016.
Entry of Appearance for Michael N. Rader in the United States Court of Appeals for the Federal Circuit, Case No. 16-1856, Apr. 29, 2016.
Entry of Appearance for Nathan R. Speed in the United States Court of Appeals for the Federal Circuit, Case No. 16-1856, 16-1883, Apr. 29, 2016.
Entry of Appearance for Peter T. Dacier in the United States Court of Appeals for the Federal Circuit, Case No. 16-1856, 16-1883, Apr. 29, 2016.
Entry of Appearance for Richard F. Giunta in the United States Court of Appeals for the Federal Circuit, Case No. 16-1856, 16-1883, Sep. 6, 2016.
Entry of Appearance for Thomas A. Brown in the United States Court of Appeals for the Federal Circuit, Case No. 16-1856, 16-1883, Apr. 29, 2016.
Entry of Appearance of Kevin Littman dated Aug. 5, 2016.
Entry of Appearance of Krishnendu Gupta dated Apr. 29, 2016.
Entry of Appearance of Lucas Silva dated Apr. 29, 2016.
Entry of Appearance of Matthew Lowrie dated Apr. 29, 2016.
Entry of Appearance of Michael Rader dated Apr. 29, 2016.
Entry of appearance of Nathan Speed as counsel for EMC dated Sep. 22, 2017.
Entry of appearance of Nathan Speed dated Apr. 29, 2016.
Entry of appearance of Paul Dacier dated Apr. 29, 2016.
Entry of Appearance of Richard Giunta as counsel for EMC dated Sep. 22, 2017.
Entry of Appearance of Thomas Brown dated Apr. 29, 2016.
Entry of Appearance, Kevin M. Littman, for the United States Court of Appeals for the Federal Circuit, Case No. 17-2519, Sep. 22, 2017.

(56) References Cited

OTHER PUBLICATIONS

Entry of Appearance, Matthew B. Lowrie, for the United States Court of Appeals for the Federal Circuit, Case No. 17-2519, Sep. 22, 2017.
Entry of Appearance, Nathan R. Speed, for the United States Court of Appeals for the Federal Circuit, Case No. 17-2519, Sep. 22, 2017.
Entry of Appearance, Richard F. Giunta, for the United States Court of Appeals for the Federal Circuit, Case No. 17-2519, Sep. 22, 2017.
Exhibit 2025, E-mail from Allan Lipka dated Apr. 6, 2008, Ezra Feedback.
Exhibit 2026, E-mail from Shlomo Ahal dated Jun. 4, 2006, summaries for Shlomo's trip.
Exhibit 2027, VMware summary word attachment to E-mail from S. Ahal dated Jun. 4, 2006, Patent Interference No. 106,070.
Exhibit 2028—VMware summary—Boston meetings attached to Jun. 4, 2016 E-mail from Sh.Ahal.
Exhibit 2029, Possible Configurations of a K-Based ESX DR Solution v.1, dated Apr. 14, 2006.
Exhibit 2030, Word attachment to Jun. 21, 2006 E-mail from J. Blumenthal, Possible Configurations of a Kashya-based ESX DR solution v.2.
Exhibit 2031, Word attachment to Jun. 21, 2006 E-mail from J. Blumenthal, Possible Configurations of a Kashya based ESX Dr Solution, with comments.
Exhibit 2032, E-mail from John Blumenthal dated Jun. 21, 2006, Integration Discussion Notes.
Exhibit 2033, E-mail from Ziv Kedem dated Aug. 15, 2006, VMware Kashya Summary.
Exhibit 2034, Word attachment to Aug. 15, 2006 E-mail from Z Kedem.
Exhibit 2035 E-mail from Narasimha Raghunandana dated Aug. 15, 2006, Kashya binary that can be installed in a virtual machine.
Exhibit 2036, E-mail from Shlomo Ahal dated Aug. 28, 2006, iKVM Workplan.
Exhibit 2037, E-mail from Shlomo Ahal dated Sep. 13, 2006, FW:proj plan.
Exhibit 2038, Word attachment to Sep. 13, 2006 E-mail from Shlomo Ahal, Disaster Recovery Project Plan.
Exhibit 2039, Kashya in VM Performance Evaluation, dated Jan. 19, 2017.
Exhibit 2040, E-mail from Matt Amdur dated Feb. 20, 2007, KVM iSCI stability.
Exhibit 2041, Santorini Functional Specifications Document, dated Jul. 10, 2007.
Exhibit 2042, E-mail from Tzach Schechner dated Mar. 1, 2007, Kashya org chart.
Exhibit 2043, E-mail from Allan Lipka dated Apr. 4, 2006, Diligence Follow Up Questions.
Exhibit 2044, E-mail from Yair Heller dated Apr. 6, 2006, Diligence follow up questions.
Exhibit 2045, E-mail from Karthik Rau dated Mar. 16, 2006, FW: Kashya scalability testing.
Exhibit 2046, Initial Complaint in United States District Court for Delaware, dated Jul. 20, 2012.
Exhibit 2047, First Amended Complaint in United States District Court for Delaware 1-12-cv-00956-GMS/, dated Aug. 19, 2013.
Exhibit 2048, Zerto's Amended Answer to the First Amended Complaint, Affirmative Defenses, and Counterclaims 1-12-CV-00956-GMS, dated Aug. 7, 2014.
Exhibit 2051. Federal Circuit Affirmance Judgement 1 -12-CV-00956-GMS, Jun. 12, 2017.
Exhibit 2052, LinkedIn profile of Shlomo Ahal, dated Jun. 13, 2017.
Exhibit 2053, Zerto Hypervisor-Based Replication, dated Jun. 23, 2017.
Exhibit 2056, Zerto's U.S. Appl. No. 13/039,446, filed Mar. 3, 2011.
Exhibit 2061, LinkedIn profile of Tzach Schechner, dated Jun. 26, 2017.
Exhibit A "Trade in Trade Up", dated Dec. 21, 2015.
Exhibit A "United States Patent and Trademark Office; *Hughes Networks Systems LLC* v *California Institute of Technology*", dated Jan. 5, 2016.
Exhibit A Case 1:12-cv-00956-GMS, dated Jul. 22, 2016.
Exhibit A Case 1:12-cv-00956-GMS, dated Sep. 1, 2016.
Exhibit B Case 1:12-cv-00956-GMS, dated Jul. 22, 2016.
Exhibit B Case 1:12-cv-00956-GMS, dated Sep. 1, 2016.
Exhibit M, Case 1:12-cv-00956-GMS dated Oct. 4, 2016.
Exhibit N, Case 1:12-cv-00956-GMS, dated Oct. 4, 2016.
Exhibit O, Case 1:12-cv-00956-GMS, Oct. 4, 2016.
Exhibit P, Case 1:12-cv-00956-GMS, Oct. 4, 2016.
Exhibits A-E, dated Dec. 4, 2015.
Ezra PowerPoint attachment to Apr. 4, 2006 E-mail from Allan Lipka, Kashya Company Overview.
Failed to Create a Quiesced Snapshot of a VM, Nov. 5, 2014, http://nakivo.com.
Features Nakivo Backup and Replication, accessed Jul. 7, 2015, http:www/nakivo.com/VMware-VM-backup-replication-features.htm.
Final Office Action for U.S. Appl. No. 13/039,446, dated Dec. 30, 2013, 9 pages.
Final Office Action on U.S. Appl. No. 13/175,892 dated Apr. 8, 2016, 9 pages.
Final Office Action on U.S. Appl. No. 14/831,623, dated May 6, 2019, 14 pages.
Final Office Action U.S. Appl. No. 13/367,448 dated Feb. 13, 2014, 12 pages.
FreezeFrame User's Guide, Version 1.1, Document Version 1.1, 60 pgs, Nov. 1993.
Harpercollins, Collins English Dictionary, Third Edition Updated 1994, Section JA-258-260(3 pages).
HP 3PAR Remote Copy Software User Guide HP 3PAR OS 3.2.1 MU2, copyright 2009.
HP 3PAR Remote Copy Software, 2015, www.hp.com.
Hyper-V Replica Feature Overview, published Feb. 29, 2012.
Illuminata EMC RecoverPoint: Beyond Basics CDP Searched via internet on Nov. 10, 2013.
Information Sheet for Filing a Petition for a Writ of Certiorari dated Jun. 12, 2017.
Initial Conference Call Transcript of Mar. 16, 2017 Before Hon Sally Gardner Lane, Patent Interference No. 106,070.
Interference Efiling Receipt, No. 106070, Jan. 31, 2017.
Is Synchronous Replication Enough, May 29, 2013, http://www.zerto.com/blog/general/is-synchronous-replication-enough.
Joint Appendix of Intrinsic and Dictionary Evidence, *EMC Corporation and EMC Israel Development Center, LTD.*, v. *Zerto, Inc.*, Case No. 12-956-GMS, May 12, 2014, (366 pages).
Joint Claim Construction Chart, *EMC Corporation and EMC Israel Development Center, LTD.*, v. *Zerto, Inc.*, Case No. 12-956(GMS), Mar. 21, 2014, (24 pages).
Judgment—Bd. R. 127 (a), issued in Patent Interference No. 106,070, Dec. 20, 2018.
Judgment from the United States Court of Appeals for the Federal Circuit dated Jun. 12, 2017.
Judgment, May 21, 2015.
Kashya Architecture PowerPoint attachment to Apr. 4, 2006 E-mail from A. Lipka.
Kashya KBX5000 Product Release 2.0 Administrators Guide, dated Nov. 15, 2004.
Kashya KBX5000 Product Release 2.3 Administrators Guide, dated Jul. 11, 2006.
Kashya KBX5000 Version 2.3 Release Notes, dated May 15, 2006.
Kedem Annotated Claims, Patent Interference No. 106,070, dated Feb. 14, 2017.
Kedem Clean Claims, Patent Interference No. 106,070, dated Jan. 31, 2017.
Kedem Exhibit 1001, LinkedIn Page of Matan Gilat, dated Sep. 13, 2017.
Kedem Exhibit 1002, U.S. Patents Listing "Karamonlis, C" as an Inventor.
Kedem Exhibit 1003, U.S. Patent Application No. 2009/0254582 A1, published Oct. 8, 2009.

(56) References Cited

OTHER PUBLICATIONS

Kedem Exhibit 1004, Declaration of Ziv Kedem, dated Oct. 20, 2017.
Kedem Exhibit 1005, Declaration of Oded Kedem, dated Oct. 20, 2017.
Kedem Exhibit 1006, Declaration of Matthew D. Green, dated Oct. 20, 2017.
Kedem Exhibit 1007, Priority Statement for Provisional Patent Application, dated Mar. 16, 2010.
Kedem Exhibit 1008, Executed Acknowledgement of No Contribution, Nov. 7, 2009.
Kedem Exhibit 1009, Declaration and Power of Attorney for U.S. Appl. No. 13/404,129, filed Feb. 14, 2012.
Kedem Exhibit 1011, Zerto, Inc. Investor Deck, dated Mar. 2010.
Kedem Exhibit 1013, Zerto Overview, dated Mar. 2010.
Kedem Exhibit 1014, Zerto—Addressing the needs of Virtual Mission Critical Applications and Cloud, web.archive.org., dated Oct. 16, 2017.
Kedem Exhibit 1015, Dictionary of Computer and Internet Terms., Ninth Edition, Douglas A. Downing, et al. pp. 138, 156 (2006).
Kedem Exhibit 1016, Small Computer System Interface-2, American National Standard for Information Systems, dated Jan. 31, 1994.
Kedem Exhibit 1023, "Zerto Wins Best of Show and Gold Awards at VMworld 2011", www.web.archive.org.
Kedem Exhibit 1025, Taylor, Colleen, "Red-hot DotCloud is Structure 2011 Launchpad Winner", Gigaom.com, dated Jun. 23, 2011.
Kedem Exhibit 1026, Application Data Sheet and Information Disclosure Statement filed for U.S. Appl. No. 13/039,446, filed Mar. 3, 2011.
Kedem Exhibit 1028, Yager, Tom, "Virtualization and I/O", Ahead of the Curve, InfoWorld, 25, 15: ProQuest, p. 26, dated Apr. 10, 2006.
Kedem Exhibit 1029, E-mail from Ziv Kedem, Subject: Congratulations on our first Alpha, dated Nov. 3, 2010.
Kedem Exhibit 1030, E-mail from Ziv Kedem, Subject: Installation Calendar, dated Oct. 14, 2010.
Kedem Exhibit 1031, E-mail from Oded Kedem, Subject: Rescheduling the Zerto install, dated Nov. 1, 2010.
Kedem Exhibit 1033, Micah Sherr, et al., "Signaling vulnerabilities in wiretapping systems", University of Pennsylvania, dated Nov. 8, 2005.
Kedem Exhibit 1034, VMware ESX Server, *Natanzon v. Kedem*, Interference No. 106,070.
Kedem Exhibit 1035, Transcript of Video Deposition of Ziv Kedem, dated Dec. 7, 2017.
Kedem Exhibit 1036, Transcript of Video Deposition of Matthew Green, dated Dec. 13, 2017.
Kedem Exhibit 1037, Transcript of Video Deposition of Oded Kedem, dated Dec. 19, 2017.
Kedem Exhibit 1038, Kedem Objections to the Admissibility of Natanzon's Evidence (for exhibits and materials submitted with Natanzon Motions 1 and 2), dated Jul. 14, 2017.
Kedem Exhibit 1039, Kedem Objections to the Admissibility of Natanzon's Evidence (for exhibits and materials submitted with Natanzon Replies 1 and 2), dated Jan. 12, 2018.
Kedem Exhibit List, Patent Interference No. 106,070, dated Oct. 20, 2017.
Kedem List of Proposed Motions, Patent Interference No. 106,070, dated Mar. 8, 2017.
Kedem Miscellaneous Motion 1 (to exclude Natanzon's Evidence, dated Jan. 17, 2018.
Kedem Notice of Change of Lead and Backup Counsel, Patent Interference No. 106,070 (Sep. 12, 2017).
Kedem Notice of Deposition for Alan Lipka for Sep. 29, 2017, Patent Interference No. 106,070 (Sep. 11, 2017).
Kedem Notice of Deposition for Chris Karamanolis for Sep. 25 and 26, 2017, Patent Interference No. 106,070 (Sep. 11, 2017).
Kedem Notice of Deposition for Ian Jestice for Sep. 28, 2017, Patent Interference No. 106,070 (Sep. 11, 2017).
Kedem Notice of Deposition for Matt Amdur for Sep. 26, 2017, Patent Interference No. 106,070 (Sep. 11, 2017).
Kedem Notice of Deposition of Matan Gilat for Sep. 14, 2017, Patent Interference No. 106,070 (Sep. 11, 2017).
Kedem Notice of Filing and Service of Deposition Transcripts, Patent Interference No. 106,070, dated Jan. 5, 2018.
Kedem Notice of Lead and Backup Counsel, Patent Interference No. 106,070, Jan. 31, 2017.
Kedem Notice of Real Party in Interest, Patent Interference No. 106,070, Jan. 31, 2017.
Kedem Notice of Related Proceedings, Patent Interference No. 106,070, dated Jan. 31, 2017.
Kedem Notice of Service of Supplemental Evidence, dated Nov. 13, 2017.
Kedem Notice of Settlement Discussions, Patent Interference No. 106,070, May 4, 2017.
Kedem Objections to the Admissibility of Natanzon's Evidence— for exhibits and materials submitted with Natanzon Motions 1 and 2, Patent Interference No. 106,070, dated Jul. 14, 2017.
Kedem Objections to the Admissibility of Natanzon's Evidence (for exhibits and materials submitted with Natanzon Replies 1 and 2), dated Jan. 12, 2018.
Kedem Opposition 1, *Kedem V. Assaf Natanzon* before the Patent Trial and Appeal Board, dated Oct. 20, 2017.
Kedem Opposition 2, *Kedem V. Assaf Natanzon* before the Patent Trial and Appeal Board, dated Oct. 20, 2017.
Kedem Opposition to Natanzon Motion to Exclude Evidence, dated Feb. 1, 2018.
Kedem Priority Statement, Patent Interference No. 106,070, Filed Jul. 7, 2017.
Kedem Reply 1 (to Exclude Natanzon Evidence), dated Feb. 7, 2018.
Kedem Request for File Copies, Patent Interference No. 106,070, Jan. 31, 2017.
Kedem Request for Oral Argument, dated Jan. 17, 2018.
Kedem Updated Exhibit List, dated Jan. 17, 2018.
Kedem Updated Exhibit List, Patent Interference No. 106,070, dated Jan. 5, 2018.
Letter from EMC to court enclosing appendix pages dated May 8, 2017.
Letter from Zerto to Court enclosing appendix pages date May 9, 2017.
Letter regarding EMC's Request to File Summary Judgment Motions— Redacted, dated Feb. 13, 2015, 120 pages.
Letter to Court from EMC regarding Aug. 16 letter to stay Case1:12-cv-00956-GMS, dated Aug. 18, 2016.
Letter to Court from Zerto regarding staying brief regarding Royalty Rate Case1:12-cv-00956-GMS, dated Aug. 16, 2015.
Letter to Judge from EMC regarding Court of Appeals Federal Circuit Order, Case 1:12-cv-00956-GMS, dated Jun. 19, 2017.
Letter to Judge Sleet from Adam Poff Regarding Defendants Response to Plaintiffs Letter of Jun. 19, 2017, Case 1:12-CV-00956-GMS, dated Aug. 21, 2017.
Letter to Judge Sleet re. *EMC Corporation v. Zerto, Inc.*, Feb. 6, 2015.
Letter to Judge Sleet Regarding EMC's Request for Summary Judgment, Oct. 21, 2014, 120 pages.
Managing VM Data with Tintri, Phillips, John, 2013.
Mandate from Court of Appeals for Federal Circuit, Case 1:12-cv-00956-GMS,Jul. 19, 2017.
Mandate from United State Court of Appeals for the Federal Circuit dated Jul. 19, 2017.
Memorandum regarding Royalties, Case 1:12-cv-00956-GMS, dated Aug. 10, 2017.
Memorandum United States District Court Delaware, dated Mar. 31, 2016.
Memorandum, *EMC Corporation and EMC Israel Development Center, LTD., v. Zerto, Inc.*, Case No. 12-956-GMS, Jul. 31, 2014 (8 pages).
Mendocino: The RecoveryOne Solution, Architecture Guide, 22 pages Product Version 1.0, Jan. 3, 2006.
Merriam-Webster, Inc., Webster's Third New International Dictionary, Section JA-276-279 (4 pages) Copyright 2002.

(56) References Cited

OTHER PUBLICATIONS

Microsoft Press, Microsoft Computer Dictionary, Fifth Edition, Section JA-341-343, p. 296 (4 pages) 2002.
Natanzon Annotated Claims, Patent Interference No. 106,070, dated Feb. 14, 2017.
Natanzon Clean Claims, Patent Interference No. 106,070, dated Feb. 1, 2017.
Natanzon Decision on Rehearing—Bd. R. 125(c), Patent Interference No. 106,070, Apr. 30, 2019.
Natanzon Exhibit 2005, Declaration of Matt Amdur, Patent Interference No. 106,070, Jun. 29, 2017.
Natanzon Exhibit 2006, Declaration of Matan Gilat, Patent Interference No. 106,070, Jun. 29, 2017.
Natanzon Exhibit 2008, Zerto U.S. Appl. No. 13/039,446 published as US 2011/0231841, dated Nov. 22, 2011.
Natanzon Exhibit 2050, *EMC* v. *Zerto*, Judgment, dated May 21, 2015.
Natanzon Exhibit 2054, U.S. Appl. No. 61/314,589, filed Mar. 17, 2010.
Natanzon Exhibit 2055, Notice of Recordation of Assignment tab of Zerto U.S. Appl. No. 61/314,589, filed Jun. 10, 2017.
Natanzon Exhibit 2058, EMC U.S. Appl. No. 13/404,129 as Published U.S. Appl. No. 13/404,129 A1, dated Jan. 10, 2013.
Natanzon Exhibit 2062, Petition Under 37 C.F.R. and 1.47 A for U.S. Appl. No. 13/404,129, filed Aug. 14, 2012.
Natanzon Exhibit 2063, Employment Agreement of Oded Kedem, dated May 9, 2006.
Natanzon Exhibit 2064, Inventions Assignment, Nondisclosure and Noncompetition Agreement between Kashya Ltd. and Shlomo Ahal, dated May 8, 2006.
Natanzon Exhibit 2065, EMC International Key Employee Agreement of Tzach Shechner, dated May 22, 2006.
Natanzon Exhibit 2067, Statement of Facts Submitted with Petition for Application on Behalf of Nonsigning Inventors, dated Aug. 10, 2012.
Natanzon Exhibit 2068, Exhibit A Declaration, Power of Attorney and Assignment signed by Assaf Natanzon on Oct. 6, 2012, and Christos Karamanolis on Jul. 10, 2012.
Natanzon Exhibit 2069, Renewed Petition, dated Sep. 5, 2012.
Natanzon Exhibit 2070, USPTO Decision on Renewed Petition, dated Sep. 21, 2012.
Natanzon Exhibit 2071, Response to Non-Final Office Action for U.S. Appl. No. 13/404,129, dated Nov. 18, 2015.
Natanzon Exhibit 2072, Supplemental Application Data Sheet, dated Jul. 11, 2017.
Natanzon Exhibit 2075, Declaration of Nathan R. Speed in Support of Motion for Admission Pro Hac Vice, Patent Interference No. 106,070, Sep. 11, 2017.
Natanzon Exhibit 2076, Transcript of Deposition of Matan Gilat, Sep. 14, 2017.
Natanzon Exhibit 2077, Transcript of Deposition of Allan Lipka, Sep. 28, 2017.
Natanzon Exhibit 2078, Transcript of Deposition of Allan Lipka, Sep. 29, 2017.
Natanzon Exhibit 2079, Transcript of Deposition of Christos Karamanolis, Sep. 25, 2017.
Natanzon Exhibit 2080, Transcript of Deposition of Christos Karamanolis, Sep. 26, 2017.
Natanzon Exhibit 2081, Transcript of Deposition of Matthew Amdur, Sep. 26, 2017.
Natanzon Exhibit 2082, Kedem Opposition 1 to Natanzon Motion for Judgment under 35 U.S.C. sec. 102(f), dated Oct. 20, 2017.
Natanzon Exhibit 2085, Zerto, Manchester VMUG 2014 and Technical Overview.
Natanzon Exhibit 2086, LinkedIn Profile of Darren Swift, Rubrik, Inc., dated Dec. 5, 2017.
Natanzon Exhibit 2087, Cisco MDS 9000 Family SANTap with EMC RecoverPoint Design Guide, dated Apr. 2009.
Natanzon Exhibit 2088, Disk Backup, A look inside continuous data protection software, dated Dec. 6, 2017.
Natanzon Exhibit 2091, Webster's Ninth New Collegiate Dictionary, Miriam-Webster, p. 630 (1990).
Natanzon Exhibit 2094, Denning, Dorothy E., Cryptography and Data Security, Addison-Wesley Publishing Company, Inc., 1982.
Natanzon Exhibit 2095, U.S. Patent Application No. 2007/0220311 A1, published Sep. 20, 2007.
Natanzon Exhibit 2096, Webster's Ninth New Collegiate Dictionary, Miriam-Webster, p. 1206 (1990).
Natanzon Exhibit 2097, Assignment for U.S. Patent Application No. 2011/356,920, Reel 017879 Frame 0115-0117, dated May 12, 2006.
Natanzon Exhibit 2098, US Office Action for U.S. Appl. No. 13/039,446 dated Jan. 2, 2015.
Natanzon Exhibit 2099, Natanzon Objections to the Admissibility of Kedem's Evidence (for exhibits and materials submitted with Kedem Oppositions 1 and 2), dated Oct. 27, 2017.
Natanzon Exhibit List, Patent Interference No. 106,070, dated Jul. 7, 2017.
Natanzon Kedem Opposition 5 (to Natanzon Motion 5, Request for Rehearing) Patent Interference No. 106,070, Mar. 8, 2019.
Natanzon List of Proposed Motions, Patent Interference No. 106,070, dated Mar. 8, 2017.
Natanzon Miscellaneous Motion 5 (Request for Hearing of Decision and Judgement) Patent Interference No. 106,070, Jan. 22, 2019.
Natanzon Motion 1, Patent Interference No. 106, 070, dated Jul. 7, 2017.
Natanzon Motion 2 (to correct inventorship), Patent Interference No. 106,070, dated Jul. 7, 2017.
Natanzon Motion to Exclude, dated Jan. 17, 2018.
Natanzon Notice of Change in Lead and Backup Counsel, Patent Interference No. 106,070, Jun. 6, 2017.
Natanzon Notice of Deposition of Oded Kedem, dated Dec. 1, 2017.
Natanzon Notice of Deposition of Professor Matthew Green, dated Dec. 1, 2017.
Natanzon Notice of Deposition of Ziv Kedem, dated Dec. 1, 2017.
Natanzon Notice of Filing Deposition Transcripts, Patent Interference No. 106,070, dated Oct. 19, 2017.
Natanzon Notice of Lead and Backup Counsel, Patent Interference No. 106,070, Feb. 1, 2017.
Natanzon Notice of Real Party in Interest, Patent Interference No. 106,070, Feb. 1, 2017.
Natanzon Notice of Related Proceedings, Patent Interference No. 106,070, dated Feb. 1, 2017.
Natanzon Notice of Service of Supplemental Evidence, Patent Interference No. 106,070, dated Jul. 28, 2017.
Natanzon Notice of Serving Priority Statement, Patent Interference No. 106,070, Jul. 10, 2017.
Natanzon Objections to the Admissibility of Kedem's Evidence, for exhibits and materials submitted with Kedem Oppositions 1 and 2, dated Oct. 27, 2017.
Natanzon Opposition to Kedem Miscellaneous Motion 1 (to exclude Natanzon's Evidence), dated Feb. 1, 2018.
Natanzon Order-Authorizing Opposition and Reply—Bd. R. 125(c)(4), Patent Interference No. 106,070, Feb. 6, 2019.
Natanzon Priority Statement, Patent Interference No. 106, 070, dated Jul. 7, 2017.
Natanzon Reply 1, dated Jan. 9, 2018.
Natanzon Reply 2, dated Jan. 9, 2018.
Natanzon Reply 5 (to Opposition to Request for Hearing of Decision and Judgement), Patent Interference No. 106,070, Mar. 22, 2019.
Natanzon Request for File Copies, Patent Interference No. 106,070, dated Feb. 1, 2017.
Natanzon Request for Oral Argument, dated Jan. 17, 2018.
Natanzon Unopposed Miscellaneous Motion 1 (Request for pro hac vice admission of Nathan R. Speed), Patent Interference No. 106,070 (Sep. 12, 2017).
Natanzon Updated Exhibit List, Patent Interference No. 106,070, dated Jul. 11, 2017.
Natanzon Updated Exhibit List, Patent Interference No. 106,070, dated Oct. 19, 2017.
Natanzon Updated Exhibit List, Patent Interference No. 106,070, Jul. 28, 2017.

(56) References Cited

OTHER PUBLICATIONS

Natanzon Updated Exhibit List, Patent Interference No. 106,070, Sep. 12, 2017.
Natanzon, Exhibit 2073, Authorization to Charge Fees for Correction of Inventorship, dated Jul. 11, 2017.
Natazon Notice of Notice of Filing Deposition Transcripts, Patent Interference No. 106,070, dated Oct. 19, 2017.
NetWorker PowerSnap Module for EMC Symmetrix, Release 2.1 Installation and Administrator's Guide, 238 pgs, printed Sep. 2005.
Non-Confidential Joint Appendix in the U.S. Court of Appeals for Federal Circuit, Case 16-1856, Document 52-1, Appx2344-4106, pp. 176-350, filed Jan. 18, 2017.
Non-Confidential Joint Appendix in the U.S. Court of Appeals for the Federal Circuit, Case No. 2016-1856,—1883, vol. I of III, Appx1-1597, Document 51-1, pp. 1-160, filed Jan. 18, 2017.
Non-Confidential Joint Appendix in the U.S. Court of Appeals for the Federal Circuit, Case No. 2016-1856,—1883, vol. III of III, Document 56-3, Appx4884-5884, pp. 1-148, filed Jan. 18, 2017.
Non-Confidential Joint Appendix in the U.S. Court of Appeals for the Federal Circuit, Case No. 2016-1856,—1883,vol. II of III, Appx 1616-4883, Document 56-2, pp. 1-225, filed Jan. 18, 2017.
Non-Confidential Joint Appendix in the United States Court of Appeals for the Federal Circuit, Case No. 2016-1856,—1883, Document 56-2, pp. 229-451, filed Jan. 18, 2017.
Non-Confidential Joint Appendix U.S. Pat. No. 6,073,209 in the United States Court of Appeals for the Federal Circuit, Case No. 2016-1856,—1883, Appx2628, Document 52-3, Part 2 of 3, Jan. 18, 2017.
Non-Confidential Joint Appendix U.S. Pat. No. 7,603,395 B1 in the United States Court of Appeals for the Federal Circuit Case No. 2016-1856,—1883, Document 51-2, Appx147, pp. 1-456, filed Jan. 18, 2017.
Non-Final Office Action on U.S. Appl. No. 14/831,623 dated Sep. 13, 2018, 14 pages.
Non-Final Office Action on U.S. Appl. No. 14/831,623 dated Sep. 20, 2019, 13 pages.
Notice from EMC Counsel regarding dates for Argument, Case No. 16-1856,—1883 Jan. 27, 2017.
Notice from EMC regarding dates for Argument dated Jan. 27, 2017.
Notice from Zerto regarding dates for argument dated Jan. 27, 2017.
Notice of Allowance for U.S. Appl. No. 13/175,892 dated Dec. 23, 2014, 9 pages.
Notice of Allowance for U.S. Appl. No. 13/175,898 dated Jul. 16, 2015, 9 pages.
Notice of Allowance for U.S. Appl. No. 13/175,892 dated Apr. 3, 2015, 8 pages.
Notice of Allowance on U.S. Appl. No. 13/367,456 dated May 11, 2016, 13 pages.
Notice of Allowance on U.S. Appl. No. 13/039,446 dated Jan. 13, 2020.
Notice of Allowance on U.S. Appl. No. 13/039,446 dated Nov. 21, 2019, 9 pages.
Notice of Allowance on U.S. Appl. No. 13/175,892 dated Mar. 2, 2018, 8 pages.
Notice of Allowance on U.S. Appl. No. 13/175,898 dated Mar. 29, 2017, 9 pages.
Notice of Allowance on U.S. Appl. No. 13/175,892 dated Feb. 20, 2019, 8 pages.
Notice of Allowance on U.S. Appl. No. 13/175,892 dated Oct. 31, 2018, 8 pages.
Notice of Allowance on U.S. Appl. No. 13/175,892, dated Jun. 14, 2018, 8 pages.
Notice of Allowance on U.S. Appl. No. 13/367,448 dated Jul. 28, 2016, 14 pages.
Notice of Allowance on U.S. Appl. No. 14/687,341 dated Aug. 18, 2016, 11 pages.
Notice of Allowance on U.S. Appl. No. 14/687,341 dated Sep. 19, 2016, 9 pages.
Notice of Allowance on U.S. Appl. No. 14/831,623 dated Feb. 12, 2020 (13 pages).
Notice of Allowance on U.S. Appl. No. 15/194,097 dated Dec. 30, 2019.
Notice of Allowance on U.S. Appl. No. 15/194,097 dated Jan. 28, 2019, 5 pages.
Notice of Allowance on U.S. Appl. No. 15/194,097 dated Jul. 27, 2018, 7 pages.
Notice of Allowance on U.S. Appl. No. 15/194,097 dated Oct. 16, 2018, 5 pages.
Notice of Allowance on U.S. Appl. No. 15/194,097 dated Sep. 11, 2019, 5 pages.
Notice of Allowance on U.S. Appl. No. 15/194,097 dated May 15, 2019, 5 pages.
Notice of Allowance on U.S. Appl. No. 15/231,388 dated Aug. 16, 2018, 11 pages.
Notice of Allowance on U.S. Appl. No. 15/231,388 dated Jan. 18, 2019, 5 pages.
Notice of Allowance on U.S. Appl. No. 15/231,388 dated Jan. 23, 2020, 8 pages.
Notice of Allowance on U.S. Appl. No. 15/231,388 dated Jan. 30, 2019, 8 pages.
Notice of Allowance on U.S. Appl. No. 15/231,388 dated Oct. 12, 2018, 8 pages.
Notice of Allowance on U.S. Appl. No. 15/231,388 dated on May 20, 2019 12 pages.
Notice of Allowance on U.S. Appl. No. 15/231,388 dated Sep. 16, 2019, 8 pages.
Notice of Allowance on U.S. Appl. No. 15/240,847 dated Feb. 25, 2019, 8 pages.
Notice of Allowance on U.S. Appl. No. 15/240,847 dated Jun. 12, 2019, 8 pages.
Notice of Allowance on U.S. Appl. No. 15/240,847 dated Nov. 15, 2018, 12 pages.
Notice of Allowance on U.S. Appl. No. 15/289,568 dated Feb. 12, 2019, 9 pages.
Notice of Allowance on U.S. Appl. No. 15/289,568 dated Jul. 5, 2018, 9 pages.
Notice of Allowance on U.S. Appl. No. 15/289,568 dated Jun. 3, 2019, 9 pages.
Notice of Allowance on U.S. Appl. No. 15/289,568 dated Oct. 23, 2018, 9 pages.
Notice of Appeal by Zerto dated Apr. 14, 2016.
Notice of Appearance of Kevin Littman as counsel for Zero, Inc. dated Sep. 22, 2017.
Notice of Appearance of Ricahrd Giunta dated Sep. 6, 2016.
Notice Of Appearance or Matthew Lowrie as counsel for Zerto,Inc. dated Sep. 22, 2017.
Notice Of Docket, United States Court of Appeals for the Federal Circuit, Case 1:12-cv-00956-GMs, Sep. 8, 2017.
Notice of Docketing dated Apr. 15, 2016.
Notice of Docketing dated Apr. 19, 2016.
Notice of Docketing for the United State Court of Appeals for the Federal Circuit, 17-2519—*EMC Corporation V. Zerto Inc*, Sep. 8, 2017.
Notice of Docketing from the United States District Court for the District of Delaware, *EMC Corporation V. Zerto Inc.*, Case No. 1:12-cv-00956-GMS.
Notice Of Docketing on Sep. 8, 2017 in the United States Court of Appeals for the Federal Circuit.
Notice of Entry of Judgment Without Opinion Entered Jun. 12, 2016, Case 1:12-cv-00956-GMS, Jun. 13, 2016.
Notice of Entry of Judgment without Opinion in the United States Court of Appeals for the Federal Court, Case No. 16-1856, Jun. 12, 2017.
Notice of Judgment without Opinion dated Jun. 12, 2017.
Notice of Stipulation of Extension of Time Periods 1&3, Patent Interference No. 106,070, Jun. 30, 2017.
Notice of Stipulation of Extension of Time Periods 3, 4, 5, & 6, Patent Interference No. 106,070 (Sep. 8, 2017).
Notice of Stipulation to Extend Time Periods 4-6, dated Nov. 30, 2017.
Notice Of Subsequent Authority dated Jan. 5, 2016.

(56) References Cited

OTHER PUBLICATIONS

Notice of Withdrawal of Certain Pro Hac Vice Counsel Aaron Moore dated Apr. 11, 2016.
Notice of Withdrawal of Monte Squire dated Nov. 11, 2015.
Notification Concerning Transmittal of International Preliminary Report on Patentability dated Jan. 7, 2014 in corresponding PCT Application No. PCT/IL2012/000271, 12 pages.
Office Action for U.S. Appl. No. 13/039,446 dated Jun. 6, 2013, 8 pages.
Office Action for U.S. Appl. No. 13/039,446 dated Mar. 4, 2013, 6 pages.
Office Action for U.S. Appl. No. 13/039,446 dated Sep. 1, 2015, 10 pages.
Office Action for U.S. Appl. No. 13/175,892 dated Apr. 18, 2014, 10 pages.
Office Action for U.S. Appl. No. 13/175,892 dated Jun. 21, 2013, 8 pages.
Office Action for U.S. Appl. No. 13/175,898 dated Jul. 17, 2014, 29 pages.
Office Action for U.S. Appl. No. 13/367,448 dated Apr. 26, 2013, 19 pages.
Office Action for U.S. Appl. No. 13/039,446 dated Jan. 2, 2015, 16 pages.
Office Action on U.S. Appl. No. 13/175,892 dated Sep. 1, 2015, 7 pages.
Office Action on U.S. Appl. No. 13/175,898 dated Dec. 18, 2015, 10 pages.
Office Action on U.S. Appl. No. 13/175,898 dated Jul. 7, 2016, 10 pages.
Office Action on U.S. Appl. No. 13/175,898 dated Mar. 25, 2015, 37 pages.
Office Action on U.S. Appl. No. 13/367,448 dated Feb. 3, 2015, 12 pages.
Office Action on U.S. Appl. No. 13/367,456 dated Oct. 1, 2015, 19 pages.
Office Action on U.S. Appl. No. 14/687,341 dated Mar. 3, 2016, 11 pages.
Office Action on U.S. Appl. No. 14/687,341 dated Sep. 11, 2015, 12 pages.
Office Action on U.S. Appl. No. 13/175,898 dated Nov. 4, 2016, 11 pages.
Office Action on U.S. Appl. No. 14/831,623 dated Feb. 22, 2018, 11 pages.
Office Action on U.S. Appl. No. 15/194,097 dated Feb. 20, 2018, 9 pages.
Office Action on U.S. Appl. No. 15/231,388 dated Feb. 23, 2018, 10 pages.
Office Action on U.S. Appl. No. 15/240,847 dated May 15, 2017 12 pages.
Office Action on U.S. Appl. No. 15/289,568 dated Mar. 29, 2018, 9 pages.
Olzak, T., "Secure hypervisor-based virtual server environments", Feb. 26, 2007. http://www.techrepublic.com/blog/security/secure-hypervisor-based-virtual-server-environments/160.
Opening Brief in Support of Defendant Zerto, Inc.'s Motion For Judgment on the Pleadings on Count III of the First Amended Compliant, *EMC Corporation and EMC Israel Development Center, LTD.*, v. *Zerto, Inc.*, Case No. 12-956-GMS, Jul. 25, 2014, (19 pages).
Opposition of Cross-Appellants EMC Corporation and EMC Israel Development Center Ltd. to Appellant Zerto, Inc.'s Motion for Extension of Time to File Its Response/Reply Brief, Appeals from the United States District Court for the District of Delaware in No. 1:12-cv-00956-GMS, Judge Gregory M. Sleet, dated Sep. 30, 2016.
Order Appellant Zerto's Response and Reply Brief dated Dec. 7, 2016.
Order Authorizing Office Records, Patent Interference No. 106,070, filed Feb. 2, 2016.
Order Construing the Terms of U.S. Pat. No. 7,647,460; U.S. Pat. No. 6,073,222; U.S. Pat. No. 7,603,395; U.S. Pat. No. 7,971,091; and U.S. Pat. No. 7,577,867, *EMC Corporation and EMC Israel Development Center, LTD.*, v. *Zerto, Inc.*, Case No. 12-956-GMS, Sep. 5, 2014, (0 pages).
Order Governing Mediation Conferences and Mediation Statements dated Apr. 19, 2016.
Order Granting Extension of Time to file Opening Brief, dated May 11, 2016.
Order Miscellaneous Bd. R. 104a, *Natanzon* V. *Kedem*, dated Jul. 11, 2017.
Order Motion Times Mar. 16 Call, Patent Interference No. 106,070, entered Mar. 20, 2017.
Order On Motion, United States Court of Appeals for the Federal Circuit, Case No. 2016-1856,-1883, dated Oct. 5, 2016.
Order regarding Post-Trial Motion, dated, Mar. 31, 2016.
Order Regarding Royalties In the District Court for Delaware, Case 1:12-cv-009560-GMS, Aug. 10, 2017.
Order rejecting EMC Corporation's Opening Brief in the United States Court of Appeals for the Federal Circuit, Case No. 16-1856, Sep. 15, 2016.
Order Rejecting EMC's Opening Brief dated Sep. 15, 2016.
Order Resetting Briefing Schedule dated Oct. 5, 2016.
Order-Miscellaneous—BS.R 104(a), Patent Interference No. 106,070, Filed Jun. 15, 2017.
Petitions for Rehearing Questions and Answers dated Jun. 12, 2017.
Plaintiff EMC and EMC Israel Development Center LTD., Bill of Costs in the United States District Court for Delaware, Case 1:12-cv-00956-GMS, dated Aug. 8, 2017.
Plaintiffs EMC Corporation and EMC Israel Development Center, LTD.'S Opening Claim Construction Brief, *EMC Corporation and EMC Israel Development Center, LTD.*,v. *Zerto, Inc.*, Case No. 12-956(GMS), Apr. 11, 2014, (26 pages).
Plaintiff's Motion for Judgment As a Matter of Law Pursuant to Fed. R. Civ. P. 50(a), May 6, 2015.
Plaintiffs Notice of Cross Appeal dated Apr. 18, 2016.
Plaintiffs' Opening Brief in Support of their Motion to Strike and Dismiss Defendant's Affirmative Defense and Counterclaims of "Invalidity" Based on Assignor Estoppel, *EMC Corporation and EMC Israel Development Center, LTD.*, v. *Zerto, Inc.*, Case No. 12-956(GMS), Oct. 4, 2012, (18 pages).
PowerPoint attachment to Jan. 30, 2006 email from Christos Karamanlis.
Project: Ezra Technical Due Diligence Meeting Notes, dated Mar. 28-31, 2006.
Proposed Order dated Apr. 26, 2016.
Reference Model for Open Storage Systems Interconnection, Mass Storage System Reference Model Version 5, Sep. 1994 (36 pages).
ReplicateVM, Replicate VMs, not LUNS, Jul. 7, 2015, http://www.tintri.com/producs/replicatevm.
Reply in Support of Natanzon Motion to Exclude, dated Feb. 7, 2018.
Report on The Filing or Determination of an Action Regarding a Patent or Trademark, May 22, 2015.
Revised Joint Claim Construction Chart, *EMC Corporation and EMC Israel Development Center, LTD.*, v. *Zerto, Inc.*, Case No. 12-956(GMS), Apr. 11, 2014, (19 pages).
Revised Joint Claim Construction Chart, *EMC Corporation and EMC Israel Development Center, LTD.*, v. *Zerto, Inc.*, Case No. 12-956(GMS), Jun. 6, 2014, (19 pages).
Scalable, High-Performance, and Cost-Effective Remote Replication on Hitachi Unified Storage and Brocade Extension Platforms, 2012, www.brocade.com.
Standing Order Before the Board of Patent Appeals and Interferences, entered Mar. 8, 2011.
Stipulation and Proposed Order regarding extension of time in the United States District Court for Delaware Case 1:12-cv-00956-GMS dated Aug. 26, 2016.
Stipulation and Proposed Order regarding Extension of Time regarding Motion for an Ongoing Royalty Rate, Case 1:12-cv-00956-GMS, Sep. 16, 2016.
Stipulation and Proposed Order regarding Royalty Briefing in the United States District Court for the District of Delaware case 1:12-cv-00956-GMS dated Jul. 22, 2016.

(56) References Cited

OTHER PUBLICATIONS

Storage Networking Industry Association Dictionary, http://web.archive.org/web20060220153102/http://www.snia.org/education/dictionary/a, pp. JA-261-JA-273 (13 pages) 2006.
Supplement to Natanzon Motion 2, dated Jul. 11, 2017.
Tech Target Search.,http://searchstorage.techtarget.com/definition/storage-snapshot.html, (p. JA-274) Jul. 2005.
The Kashya KB 4000 Administrator's User Guide Product Release 2.0, 105 pgs, Aug. 2004.
The RecoveryONE Solution, Architecture Guide, Product Version 1.0, 22 pgs, Jan. 2006.
Transcript of Markman Hearing, *EMC Corporation and EMC Israel Development Center, LTD.*, v. *Zerto, Inc.*, Case No. 12-956-GMS, Jun. 25, 2014 (94 pgs).
Unitrends Enterprise Backup Software and Solutions, 2015, http://www.unitrends.com/products/enterprise-backup-software/unitrends-enterprise-backup.
Unitrends Release 7.3 Beta Now Available, Nov. 26, 2013, http://blogs.unitrends.com/unitrends-release-7-3-beta-now-available/.
U.S. Final Office Action on U.S. Appl. No. 16/654,557 dated Dec. 28, 2020 (26 pages).
U.S. Non-Final Office Action on U.S. Appl. No. 16/654,557 dated Aug. 13, 2020 (23 page).
U.S. Notice of Allowance on U.S. Appl. No. 13/175,892 dated Oct. 17, 2017, 5 pages.
U.S. Notice of Allowance on U.S. Appl. No. 13/175,892 dated Oct. 3, 2017, 8 pages.
U.S. Notice of Allowance on U.S. Appl. No. 13/175,892 dated Jul. 7, 2021 (8 pages).
U.S. Notice of Allowance on U.S. Appl. No. 16/654,557 dated Mar. 4, 2021 (11 pages).
U.S. Office Action on U.S. Appl. No. 14/831,623 dated Jul. 31, 2017, 7 pages.
U.S. Office Action on U.S. Appl. No. 15/231,388 dated Aug. 29, 2017 10 pages.
U.S. Office Action on U.S. Appl. No. 15/240,847 dated Oct. 23, 2017, 23 pages.
VMware vCenter Site Recovery Manager5 with vSphere Replication, 2011.
VMware vSphere Replication 6.0, Apr. 2015.
VReplicator Version 3.0, 2009.
Warrick, et al., "IBM Total Storage Enterprise Storage Server Implementing ESS Copy Services in Open Environments", 642 pgs, IBM Jul. 2004.
Word attachment to Mar. 15, 2006 email from K. Rau, ESX Disaster Recovery Roadmap.
Zerto Announces General Availability of Zerto Virtual Replication Version 4.0, May 5, 2015.
Zerto Continuation U.S. Patent Application as published U.S. Pat. No. 20160357593 A1, dated Oct. 8, 2016.
Zerto Inc Certificate of Interest dated Apr. 29, 2016.
Zerto Inc Docketing Statement dated Apr. 29, 2016.
Zerto Inc.'s Motion for Judgment as a Matter of Law, May 6, 2015.
Zerto Raises 26 Million in Series D Financing to Accelerate Hybrid Cloud Adoption, Jun. 18, 2014.
Zerto Virtual Replication Release Notes, 2015.
Zerto, Inc.'s Appeal Brief in the United States District Court for the District of Delaware in No. 1:12-cv-00956-GMS, Judge Gregory M. Sleet, dated Aug. 5, 2016.
Zerto, Inc.'s Docketing Statement in the United States Court of Appeals for the Federal Circuit, Case No. 16-1856, 16-1883, Apr. 29, 2016.
Zerto, Inc's Brief In Support of Its Motion For A New Trial, and to Alter or Amend The Judgment, Due to an Inconsistent Verdict, Jun. 19, 2015.
Zerto, Inc's Brief In Support of Its Renewed Motion For Judgment As A Matter Of Law Or, In The Alternative, For A New Trial, Jun. 19, 2015.
Zerto. Inc.'s Certificate of Interest in the United States Court of Appeals for the Federal Circuit, Case No. 16-1856, 16-1883, Apr. 29, 2016.
Zerto's Appeal Brief, dated Aug. 5, 2016.
Zerto's Certificate of Compliance dated Jan. 24, 2017.
Zerto's certificate of interest dated Sep. 22, 2017.
Zerto's Corrected Certificate of Interest dated May 2, 2016.
Zerto's Corrected Response and Reply Brief, dated Dec. 21, 2016.
Zerto's Docketing Statement dated Sep. 22, 2017.
Zerto's Docketing Statement in the United States Court of Appeals for the Federal Circuit, Case No. 17-2519, Sep. 22, 2017.
Zerto's Hypervisor-based Replication: A New Approach to Business/Continuity Disaster Recovery, 2012.
Zerto's Hypervisor-Based, Enterprise-Class Replication and Continuous Data Protection, 2012.
Zerto's Motion for Extension of Time to file its Initial Brief, dated May 4, 2016.
Zerto's Notice of Intent to Redact dated Apr. 5, 2016.
Zerto's Opposition to the EMC Motion to Supplement the Record, dated Dec. 21, 2015.
Zerto's Protect Applications, Not Just Data: BC/DR for Virtualized Applications, 2012.
Zerto's Transcript Purchase Order Case 1:12-cv-00956-GMS dated Apr. 28, 2016.
Zerto's ZVR and Hyper-V, 2014.
Zertos's Citation of Supplemental Authority and Matthew Lowrie's certificate of service dated May 3, 2017.
Zetro's Motion for Extension of Time to File Response Brief dated Sep. 29, 2016.

\* cited by examiner

METHODS AND APPARATUS FOR PROVIDING HYPERVISOR LEVEL DATA SERVICES FOR SERVER VIRTUALIZATION

CROSS REFERENCES TO RELATED APPLICATIONS

This application is a continuation of, and claims priority under 35 U.S.C. § 120 and benefit of U.S. patent application Ser. No. 16/654,557, titled METHODS AND APPARATUS FOR PROVIDING HYPERVISOR LEVEL DATA SERVICES FOR SERVER VIRTUALIZATION, filed Oct. 16, 2019 by inventor Ziv Kedem, which is a continuation of, and claims priority under 35 U.S.C. § 120 and benefit of U.S. patent application Ser. No. 15/240,847, titled METHODS AND APPARATUS FOR PROVIDING HYPERVISOR LEVEL DATA SERVICES FOR SERVER VIRTUALIZATION, filed Aug. 18, 2016 by inventor Ziv Kedem, which is a continuation of, and claims priority under 35 U.S.C. § 120 and benefit of U.S. patent application Ser. No. 13/039,446, titled METHODS AND APPARATUS FOR PROVIDING HYPERVISOR LEVEL DATA SERVICES FOR SERVER VIRTUALIZATION, filed Mar. 3, 2011 by inventor Ziv Kedem, which claims priority under 35 U.S.C. § 119 and benefit of U.S. Provisional Application No. 61/314,589, titled METHODS AND APPARATUS FOR PROVIDING HYPERVISOR LEVEL DATA SERVICES FOR SERVER VIRTUALIZATION, filed on Mar. 17, 2010 by inventor Ziv Kedem, each of which is incorporated by reference in its entirety.

FIELD OF THE INVENTION

The present invention relates to virtual server environments and data services.

BACKGROUND OF THE INVENTION

Virtual servers are logical entities that run as software in a server virtualization infrastructure, referred to as a "hypervisor". Examples of hypervisors are VMWARE® ESX manufactured by VMware, Inc. of Palo Alto, Calif., HyperV manufactured by Microsoft Corporation of Redmond, Wash., XENSERVER® manufactured by Citrix Systems, Inc. of Fort Lauderdale, Fla., Redhat KVM manufactured by Redhat, Inc. of Raleigh, N.C., and Oracle VM manufactured by Oracle Corporation of Redwood Shores, Calif. A hypervisor provides storage device emulation, referred to as "virtual disks", to virtual servers. Hypervisor implements virtual disks using back-end technologies such as files on a dedicated file system, or raw mapping to physical devices.

As distinct from physical servers that run on hardware, virtual servers run their operating systems within an emulation layer that is provided by a hypervisor. Although virtual servers are software, nevertheless they perform the same tasks as physical servers, including running server applications such as database applications, customer relation management applications and MICROSOFT EXCHANGE SERVER®. Most applications that run on physical servers are portable to run on virtual servers. As distinct from virtual desktops that run client side applications and service individual users, virtual servers run applications that service a large number of clients.

As such, virtual servers depend critically on data services for their availability, security, mobility and compliance requirements, the data services including inter alia continuous data protection, disaster recovery, remote replication, data security, mobility, and data retention and archiving policies

SUMMARY OF THE DESCRIPTION

Aspects of the present invention relate to a dedicated virtual data service appliance (VDSA) within a hypervisor that can provide a variety of data services. Data services provided by a VDSA include inter alia replication, monitoring and quality of service.

In an embodiment of the present invention, a tapping filter driver is installed within the hypervisor kernel. The tapping driver has visibility to I/O requests made by virtual servers running on the hypervisor.

A VDSA runs on each physical hypervisor. The VDSA is a dedicated virtual server that provides data services; however, the VDSA does not necessarily reside in the actual I/O data path. When a data service processes I/O asynchronously, the VDSA receives the data outside the data path.

Whenever a virtual server performs I/O to a virtual disk, the tapping driver identifies the I/O requests to the virtual disk. The tapping driver copies the I/O requests, forwards one copy to the hypervisor's backend, and forwards another copy to the VDSA.

Upon receiving an I/O request, the VDSA performs a set of actions to enable various data services. A first action is data analysis, to analyze the data content of the I/O request and to infer information regarding the virtual server's data state. E.g., the VDSA may infer the operating system level and the status of the virtual server. This information is subsequently used for reporting and policy purposes.

A second action, optionally performed by the VDSA, is to store each I/O write request in a dedicated virtual disk for journaling. Since all I/O write requests are journaled on this virtual disk, the virtual disk enables recovery data services for the virtual server, such as restoring the virtual server to an historical image.

A third action, optionally performed by the VDSA, is to send I/O write requests to different VDSAs, residing on hypervisors located at different locations, thus enabling disaster recovery data services.

There is thus provided in accordance with an embodiment of the present invention a hypervisor virtual server system, including a plurality of virtual servers, a plurality of virtual disks that are read from and written to by the plurality of virtual servers, a physical disk, an I/O backend coupled with the physical disk and in communication with the plurality of virtual disks, which reads from and writes to the physical disk, a tapping driver in communication with the plurality of virtual servers, which intercepts I/O requests made by any one of said plurality of virtual servers to any one of said plurality of virtual disks, and a virtual data services appliance, in communication with the tapping driver, which receives the intercepted I/O write requests from the tapping driver, and which provides data services based thereon.

There is additionally provided in accordance with an embodiment of the present invention a method for providing data services within a hypervisor virtual server system, including intercepting I/O requests from any one of a plurality of virtual servers to one of a plurality of virtual disks, and sending intercepted I/O write requests to a virtual data services appliance that provides hypervisor data services.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to a dedicated virtual data services appliance (VDSA) within a hypervisor, which is used to provide a variety of hypervisor data services. Data services provided by a VDSA include inter alia replication, monitoring and quality of service.

Figure 1:
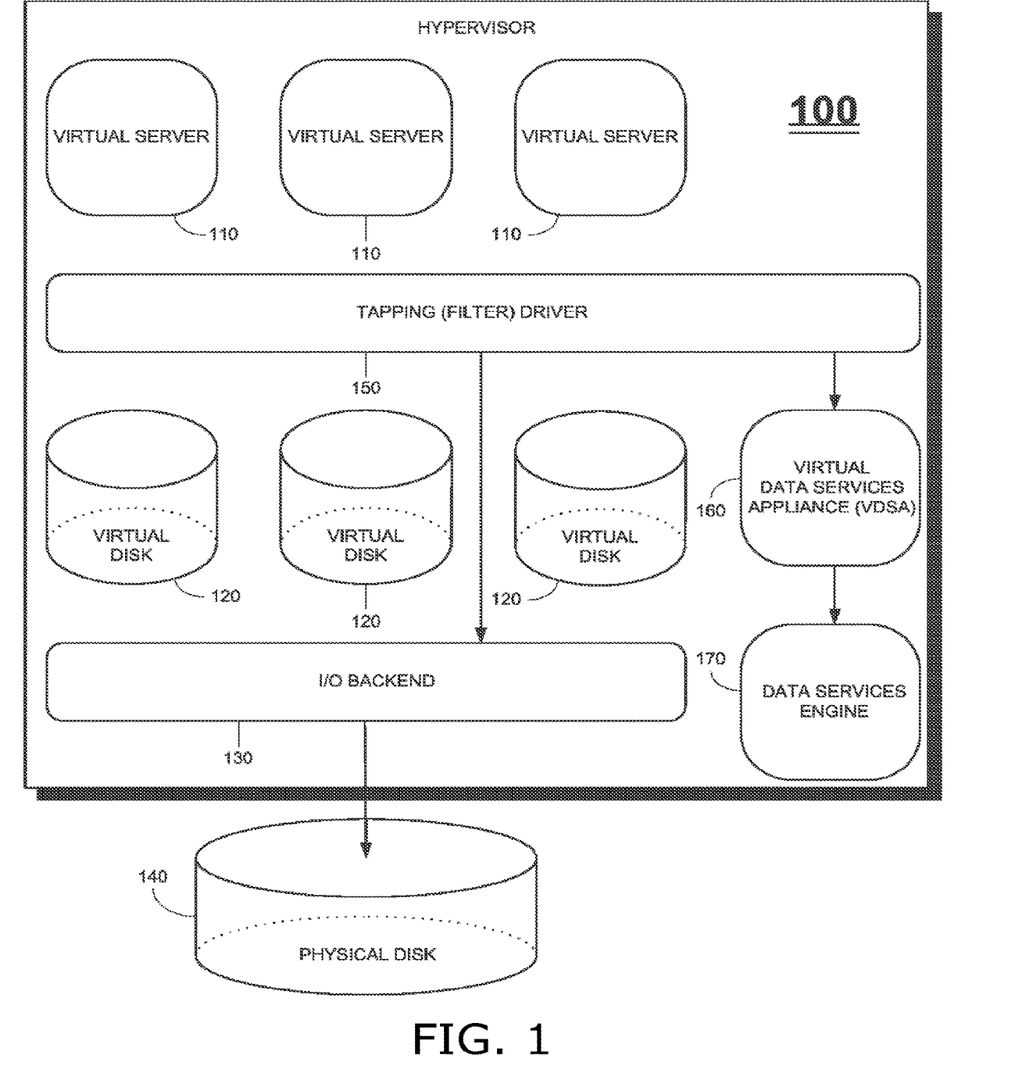
FIG. 1 is a simplified block diagram of a hypervisor architecture that includes a tapping driver and a virtual data services appliance, in accordance with an embodiment of the present invention.

Reference is made to FIG. 1, which is a simplified block diagram of a hypervisor architecture that includes a tapping driver and a VDSA, in accordance with an embodiment of the present invention. Shown in FIG. 1 is a hypervisor 100 with three virtual servers 110, three virtual disks 120, an I/O backend 130 and a physical storage array 140. Hypervisor 100 uses a single physical server, but runs multiple virtual servers 110. Virtual disks 120 are a storage emulation layer that provide storage for virtual servers 110. Virtual disks 120 are implemented by hypervisor 100 via I/O backend 130, which connects to physical disk 140.

Hypervisor 100 also includes a tapping driver 150 installed within the hypervisor kernel. As shown in FIG. 1, tapping driver 150 resides in a software layer between virtual servers 110 and virtual disks 120. As such, tapping driver 150 is able to access I/O requests performed by virtual servers 110 on virtual disks 120. Tapping driver 150 has visibility to I/O requests made by virtual servers 110.

Hypervisor 100 also includes a VDSA 160. In accordance with an embodiment of the present invention, a VDSA 160 runs on a separate virtual server within each physical hypervisor. VDSA 160 is a dedicated virtual server that provides data services via one or more data services engines 170. However, VDSA 160 does not reside in the actual I/O data path between I/O backend 130 and physical disk 140. Instead, VDSA 160 resides in a virtual I/O data path.

Whenever a virtual server 110 performs I/O on a virtual disk 120, tapping driver 150 identifies the I/O requests that the virtual server makes. Tapping driver 150 copies the I/O requests, forwards one copy via the conventional path to I/O backend 130, and forwards another copy to VDSA 160. In turn, VDSA 160 enables the one or more data services engines 170 to provide data services based on these I/O requests.

Figure 2:
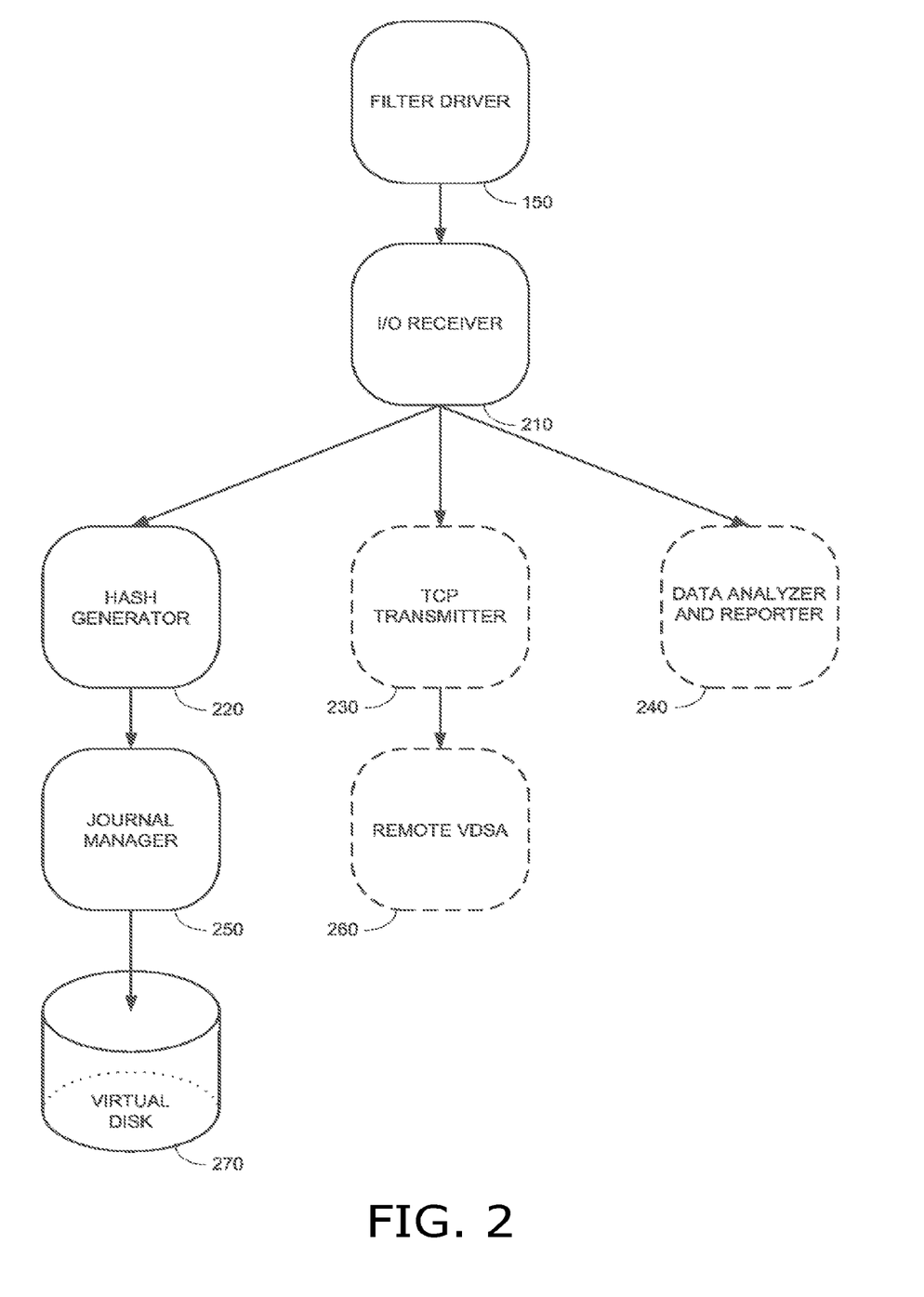
FIG. 2 is a simplified data flow chart for a virtual data services appliance, in accordance with an embodiment of the present invention.

Reference is made to FIG. 2, which is a simplified data flow chart for a VDSA, in accordance with an embodiment of the present invention. Shown in FIG. 2 are an I/O receiver 210, a hash generator 220, a TCP transmitter 230, a data analyzer and reporter 240, a journal manager 250 and a remote VDSA 260. Remote VDSA 260 resides on different physical hardware, at a possibly different location.

As shown in FIG. 2, I/O receiver 210 receives an intercepted I/O request from tapping driver 150. VDSA 160 makes up to three copies of the received I/O requests, in order to perform a set of actions which enable the one or more data services engines 170 to provide various services.

A first copy is stored in persistent storage, and used to provide continuous data protection. Specifically, VDSA 160 sends the first copy to journal manager 250, for storage in a dedicated virtual disk 270. Since all I/O requests are journaled on virtual disk 270, journal manager 250 provides recovery data services for virtual servers 110, such as restoring virtual servers 110 to an historical image. In order to conserve disk space, hash generator 220 derives a one-way hash from the I/O requests. Use of a hash ensures that only a single copy of any I/O request data is stored on disk.

An optional second copy is used for disaster recovery. It is sent via TCP transmitter 230 to remote VDSA 260. As such, access to all data is ensured even when the production hardware is not available, thus enabling disaster recovery data services.

An optional third copy is sent to data analyzer and reporter 240, which generates a report with information about the content of the data. Data analyzer and reporter 240 analyzes data content of the I/O requests and infers information regarding the data state of virtual servers 110. E.g., data analyzer and reporter 240 may infer the operating system level and the status of a virtual server 110.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system, comprising:
 a tapping driver implemented on a hypervisor that is executed on at least one physical server, the tapping driver to:
  identify an input/output (I/O) request from a virtual server to a virtual disk via an I/O data path;
  generate a copy of the I/O request to be forwarded to a virtual data services appliance residing outside the I/O data path, the virtual data services appliance to: (i) provide data services based on the copy of the I/O request asynchronously to processing of the I/O request in the I/O data path and (ii) provide the copy of the I/O request to a data analyzer to determine a state of the virtual server;
  cause the I/O request to be forwarded along the I/O data path to the virtual disk; and
  cause the copy of the I/O request to be forwarded, concurrent to the forwarding along the I/O data path, to the virtual data services appliance.

2. The system of claim 1, comprising the tapping driver to cause the I/O request to be forwarded to the virtual data services appliance to cause the virtual data services appliance to perform at least one action of a set of actions based on the I/O request to provide the data services via a data services engine.

3. The system of claim 1, comprising the tapping driver to send the I/O request to a journal manager to cause the journal manager to store the I/O request as a journal entry in the virtual disk.

4. The system of claim 1, comprising the tapping driver to generate the copy of the I/O request, concurrent to forwarding of the I/O request from the virtual server to the virtual disk via the I/O data path, to be forwarded to the virtual data services appliance.

5. The system of claim 1, comprising the tapping driver to intercept the I/O request made by the virtual server to the virtual disk from the I/O data path.

6. The system of claim 1, comprising the tapping driver to send the I/O request via a virtual I/O data path to a data services engine, the virtual I/O data path separate from the I/O data path, the virtual I/O data path including the virtual data services appliance.

7. The system of claim 1, comprising the tapping driver residing on a layer between the virtual server and the virtual disk and having visibility to the I/O data path between the virtual server and the virtual disk.

8. A system, comprising:
- a virtual data services appliance implemented on a hypervisor that is executed on at least one physical server, the virtual data services appliance to:
  - receive a copy of an input/output (I/O) request forwarded outside of an I/O data path by a tapping driver, separately from the tapping driver causing forwarding of the I/O request from a virtual server to a virtual disk along the I/O data path;
  - process the copy of the I/O request asynchronously to provide data services for the hypervisor based on the I/O request; and
  - provide the copy of the I/O request to a data analyzer to determine a state of the virtual server.

9. The system of claim 8, comprising the virtual data services appliance to generate a plurality of copies of the I/O request with which to perform at least one of a set of actions to provide the data services.

10. The system of claim 8, comprising the virtual data services appliance to provide the copy of the I/O request to a journal manager to journal the I/O request on a dedicated virtual disk.

11. The system of claim 8, comprising the virtual data services appliance to provide the copy of the I/O request to a remote virtual data services to provide recovery data services.

12. The system of claim 8, comprising the virtual data services appliance to provide, based on the copy of the I/O request received from the tapping driver, the data services including at least one of inter alia replication, monitoring, or quality of service.

13. The system of claim 8, comprising the virtual data services appliance residing on a virtual I/O data path separate from the I/O data path between the virtual server and the virtual disk.

14. A method, comprising:
- receiving, by a virtual data services appliance implemented on a hypervisor, a copy of an input/output (I/O) request forwarded outside of an I/O data path by a tapping driver, separately from the tapping driver causing forwarding of the I/O request from a virtual server to a virtual disk along the I/O data path;
- processing, by the virtual data services appliance, the copy of the I/O request asynchronously to provide data services for the hypervisor based on the I/O request; and
- providing, by the virtual data services appliance, the copy of the I/O request to a data analyzer to determine a state of the virtual server.

15. The method of claim 14, comprising:
generating, by the virtual data services appliance, a plurality of copies of the I/O request with which to perform at least one of a set of actions to provide the data services.

16. The method of claim 14, comprising:
providing, by the virtual data services appliance, the copy of the I/O request to a journal manager to journal the I/O request on a dedicated virtual disk.

17. The method of claim 14, comprising:
providing, by the virtual data services appliance, the copy of the I/O request to a remote virtual data services to provide recovery data services.

18. The method of claim 14, comprising:
providing, by the virtual data services appliance, based on the copy of the I/O request received from the tapping driver, the data services including at least one of inter alia replication, monitoring, or quality of service.

* * * * *